(12) United States Patent
Takai et al.

(10) Patent No.: US 7,930,385 B2
(45) Date of Patent: Apr. 19, 2011

(54) DETERMINING CONTENT-PREFERENCE SCORE FOR CONTROLLING SUBSEQUENT PLAYBACK

(75) Inventors: Motoyuki Takai, Tokyo (JP); Yasushi Miyajima, Kanagawa (JP); Kosei Yamashita, Kanagawa (JP); Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 411 days.

(21) Appl. No.: 11/520,258

(22) Filed: Sep. 13, 2006

(65) Prior Publication Data

US 2007/0074253 A1 Mar. 29, 2007

(30) Foreign Application Priority Data

Sep. 20, 2005 (JP) ................................ 2005-271266

(51) Int. Cl.
*G06F 15/173* (2006.01)
*H04N 5/445* (2006.01)
(52) U.S. Cl. ............. 709/224; 709/223; 725/45; 725/46
(58) Field of Classification Search .................. 709/217, 709/231, 223, 224; 725/45, 46
See application file for complete search history.

(56) References Cited

U.S. PATENT DOCUMENTS

| | | | |
|---|---|---|---|
| 7,395,549 B1* | 7/2008 | Perlman et al. ................. | 726/10 |
| 2002/0073417 A1 | 6/2002 | Kondo et al. | |
| 2003/0026433 A1* | 2/2003 | Matt ............................. | 380/278 |
| 2003/0163693 A1* | 8/2003 | Medvinsky .................... | 713/169 |
| 2005/0041951 A1* | 2/2005 | Inoue et al. .................... | 386/46 |
| 2005/0241465 A1* | 11/2005 | Goto ............................... | 84/616 |
| 2005/0288991 A1* | 12/2005 | Hubbard et al. ................ | 705/10 |
| 2006/0078297 A1* | 4/2006 | Nishikawa et al. ............ | 386/69 |
| 2006/0174291 A1* | 8/2006 | Takai et al. ..................... | 725/88 |
| 2006/0220882 A1* | 10/2006 | Makino ...................... | 340/573.1 |
| 2006/0245599 A1* | 11/2006 | Regnier ........................... | 381/79 |
| 2007/0025194 A1* | 2/2007 | Morse et al. ................. | 369/30.1 |
| 2007/0085759 A1* | 4/2007 | Lee et al. ........................ | 345/1.1 |
| 2007/0186752 A1* | 8/2007 | Georges et al. ................ | 84/609 |
| 2007/0221045 A1* | 9/2007 | Terauchi et al. ................ | 84/609 |

FOREIGN PATENT DOCUMENTS

| | | |
|---|---|---|
| EP | 1 503 376 A2 | 2/2005 |
| JP | 06-290574 A | 10/1994 |
| JP | 10-55174 | 2/1998 |
| JP | 3088409 | 7/2000 |
| JP | 3147888 | 1/2001 |
| JP | 2001-321564 | 11/2001 |
| JP | 2002-049631 A | 2/2002 |
| JP | 2002-108918 | 4/2002 |
| JP | 2003-23589 | 1/2003 |
| JP | 2003-037856 | 2/2003 |
| JP | 2004-073272 | 3/2004 |
| JP | 2004-199667 | 7/2004 |
| JP | 2004-234807 A | 8/2004 |
| JP | 3598613 | 9/2004 |
| JP | 2004-326840 | 11/2004 |
| JP | 2004-361713 A | 12/2004 |
| JP | 2004-362145 A | 12/2004 |
| WO | WO 2004/07770 A1 | 9/2004 |

* cited by examiner

*Primary Examiner* — Shawki S Ismail
(74) *Attorney, Agent, or Firm* — Wolf, Greenfield & Sacks, P.C.

(57) ABSTRACT

A content-preference-score determining method includes the steps of detecting a feature point or feature value of content; detecting body motion of a user during playback of the content; and calculating a preference score of the user for the content according to a predefined formula using the detected feature point or feature value and the detected body motion.

13 Claims, 14 Drawing Sheets

FIG. 9

$$R(t) = \{\alpha \cdot C(t) + \beta \cdot P(t)\} \cdot I(t) \quad \ldots(1)$$

R(t) : PREFERENCE SCORE AT TIME t

C(t) : DEGREE OF MATCHING OF PERIOD BETWEEN BODY-MOTION DETECTION SIGNAL AND BEAT INFORMATION

P(t) : DEGREE OF MATCHING OF PHASE BETWEEN BODY-MOTION DETECTION SIGNAL AND BEAT INFORMATION

I(t) : MAGNITUDE OF BODY MOTION (INTENSITY OF RHYTHM)

α,β : WEIGHTING COEFFICIENTS

FIG. 10

$$C(t) = |Bc(t) - Sc(t)| \quad \ldots(2)$$

Sc(t) : PERIOD OF BODY-MOTION DETECTION SIGNAL

Bc(t) : PERIOD OF BEAT INFORMATION $$Bc(t) = b(t+1) - b(t) \quad \ldots(3)$$

b(t), b(t+1) : BEAT TIMING $$Sc(t) = s(t + 1) - s(t) \quad \ldots(4)$$

s(t), s(t + 1): MINIMUM-POINT TIMING $$d(t) = \frac{1}{T}\sum_{t-T}^{t}(b(t) - s(t)) \quad \ldots(5)$$

$$P(t) = 1 / d(t) \quad \ldots(6)$$

FIG. 14
$$SD(d(t)) = \sqrt{(d(t) - daverage\,(t,\,T))^2 / T} \qquad \ldots(7)$$
$$P(t) = 1 / SD(d(t)) \qquad \ldots(8)$$
FIG. 15
$$I(t) = A(t) / N \qquad \ldots(9)$$
FIG. 16A
FIG. 16B
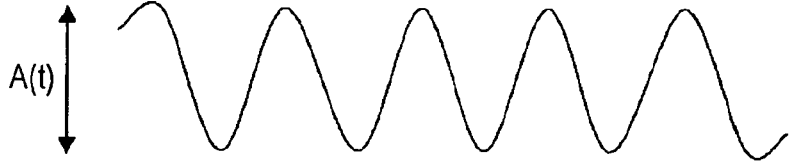

$$Rn \leq Rmax < Rn + 1 \quad \ldots(11)$$

$$\sum R(t) / T \quad \ldots(12)$$

| SONG TITLE | ARTIST NAME | tmax | PREFERENCE SCORE R(tmax) |
|---|---|---|---|
| Song1 | Taro | 01 : 45 | 3 |
| Song2 | Taro | 02 : 15 | 2 |
| Song3 | Taro | 01 : 37 | 3 |

FIG. 21A
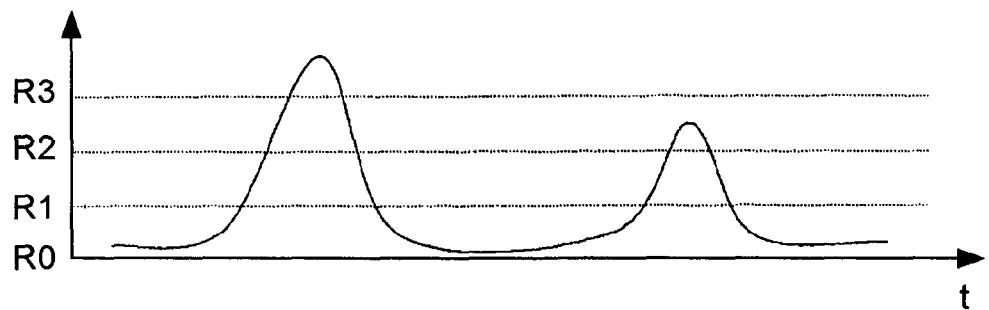
FIG. 21B
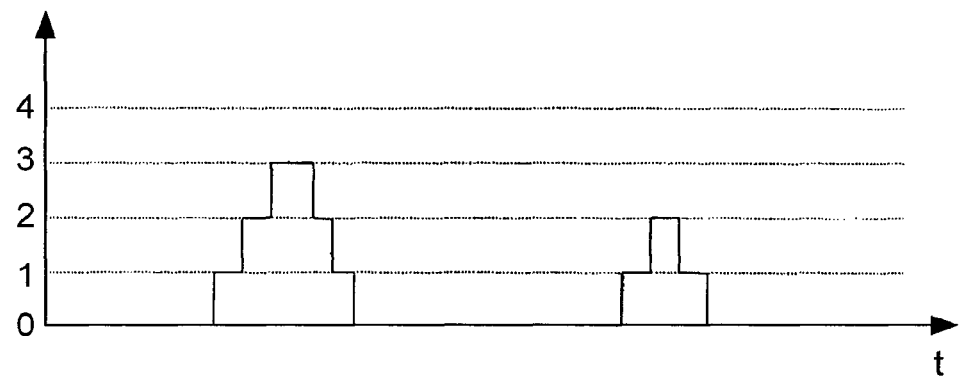
FIG. 22
| Song1 | | |
|---|---|---|
| Start | End | R(t) |
| 00 : 00 | 00 : 40 | 0 |
| 00 : 40 | 01 : 12 | 1 |
| 01 : 12 | 01 : 34 | 2 |
| 01 : 34 | 01 : 59 | 3 |
| 01 : 59 | 02 : 23 | 2 |
| 02 : 23 | 02 : 48 | 1 |
| 02 : 48 | 04 : 13 | 0 |
| 04 : 13 | 04 : 26 | 1 |
| 04 : 26 | 04 : 38 | 2 |
| 04 : 38 | 04 : 51 | 1 |
| 04 : 51 | 05 : 30 | 0 |

DETERMINING CONTENT-PREFERENCE SCORE FOR CONTROLLING SUBSEQUENT PLAYBACK

CROSS REFERENCES TO RELATED APPLICATIONS

The present invention contains subject matter related to Japanese Patent Application JP 2005-271266 filed in the Japanese Patent Office on Sep. 20, 2005, the entire contents of which are incorporated herein by reference.

BACKGROUND OF THE INVENTION

1. Field of the Invention

The present invention relates to a method for determining a preference score of a user for content, such as music content or video content, and to an apparatus and method for playing back content.

2. Description of the Related Art

There exist various types of music content, video content, or the like, so that the degree of preference of a user varies among individual pieces of content.

Thus, in a content playback apparatus or the like, if it is possible to determine preference scores of a user for individual pieces of content, it is possible to utilize the preference scores for selection of content, so that the user can enjoy content of interest. As well as selection of content, depending on the type of apparatus, it is possible to remix music or video in real time according to the user's preference, like a disk jockey (DJ) or a video jockey (VJ), and to provide remixed music or video to the user.

Generally, when preference scores of a user for content are to be determined in a content playback apparatus or the like, the user specifies ratings representing the user's evaluation or preference for individual pieces of content, for example, using a personal computer or the like.

According to techniques disclosed in Japanese Unexamined Patent Application Publication No. 2003-23589, a preference score of a viewer for a piece of content is calculated on the basis of the viewing history of the piece of content, as a function of a ratio of the content viewing time to a unit time or a function of a ratio of the content viewing time to the content time length.

SUMMARY OF THE INVENTION

However, it is laborious for the user to specify ratings representing the user's evaluation or preference for individual pieces of content using a personal computer or the like. This become even more laborious when ratings are given for individual segments of pieces of content.

Furthermore, according to the techniques disclosed in Japanese Unexamined Patent Application Publication No. 2003-23589, for example, even when the user listens to only a beginning part of a piece of music and likes the music, the preference score does not become high until the user listens to (plays back) the music till the end. Conversely, when the user listens to (plays back) a piece of music till the end, a high preference score is obtained even if the user does not particularly like the music. Therefore, in some cases, a preference score of the user for a piece of content is not determined accurately. Furthermore, according to the techniques disclosed in Japanese Unexamined Patent Application Publication No. 2003-23589, it is difficult to calculate preference scores for individual segments of content.

It is desired that preference scores of a user for content can be determined readily and accurately, and that preference scores can be readily determined for individual segments of content.

According to an embodiment of the present invention, there is provided a content-preference-score determining method including the steps of detecting a feature point or feature value of content; detecting body motion of a user during playback of the content; and calculating a preference score of the user for the content according to a predefined formula using the detected feature point or feature value and the detected body motion.

According to the content-preference-score determining method, a preference score of a user for content is determined on the basis of the degree or status of natural synchronization by the user with the content, i.e., how the user moves the body in synchronization with music or video.

Furthermore, in a content playback apparatus, it is readily possible to determine a preference score for each segment of content and to set the preference score in association with the segment (i.e., to record the preference score in association with the segment). Thus, it is possible to play back content in accordance with preference of the user. For example, it is possible to play back only segments with highest preference scores in individual pieces of content, to sequentially play back a plurality of pieces of content in descending order of highest preference score, or to repeatedly play back a segment with a highest preference score in content.

As described above, according to embodiments of the present invention, a preference score of a user for content can be determined readily and accurately, it becomes readily possible to determine preference scores for individual segments of content, and it become readily possible to play back content in accordance with preference of a user.

BRIEF DESCRIPTION OF THE DRAWINGS

FIG. 9 is a diagram showing an example of formula for calculating a preference score;

FIG. 10 is a diagram showing an example of formula for calculating a degree of matching of period;

FIG. 14 is a diagram showing an example of formula for calculating a degree of matching of phase;

FIG. 15 is a diagram showing an example of formula for calculating a magnitude of body motion;

FIGS. 16A and 16B are diagrams showing how the amplitudes body-motion detection signals change;

FIGS. 21A and 21B are graphs showing an example of calculated preference score and integer representation thereof;

FIG. 22 showing an example of preference-score table representing preference-score information;

DESCRIPTION OF THE PREFERRED EMBODIMENTS

1. Overview of System and Method (FIGS. 1 and 2)

Figure 1:
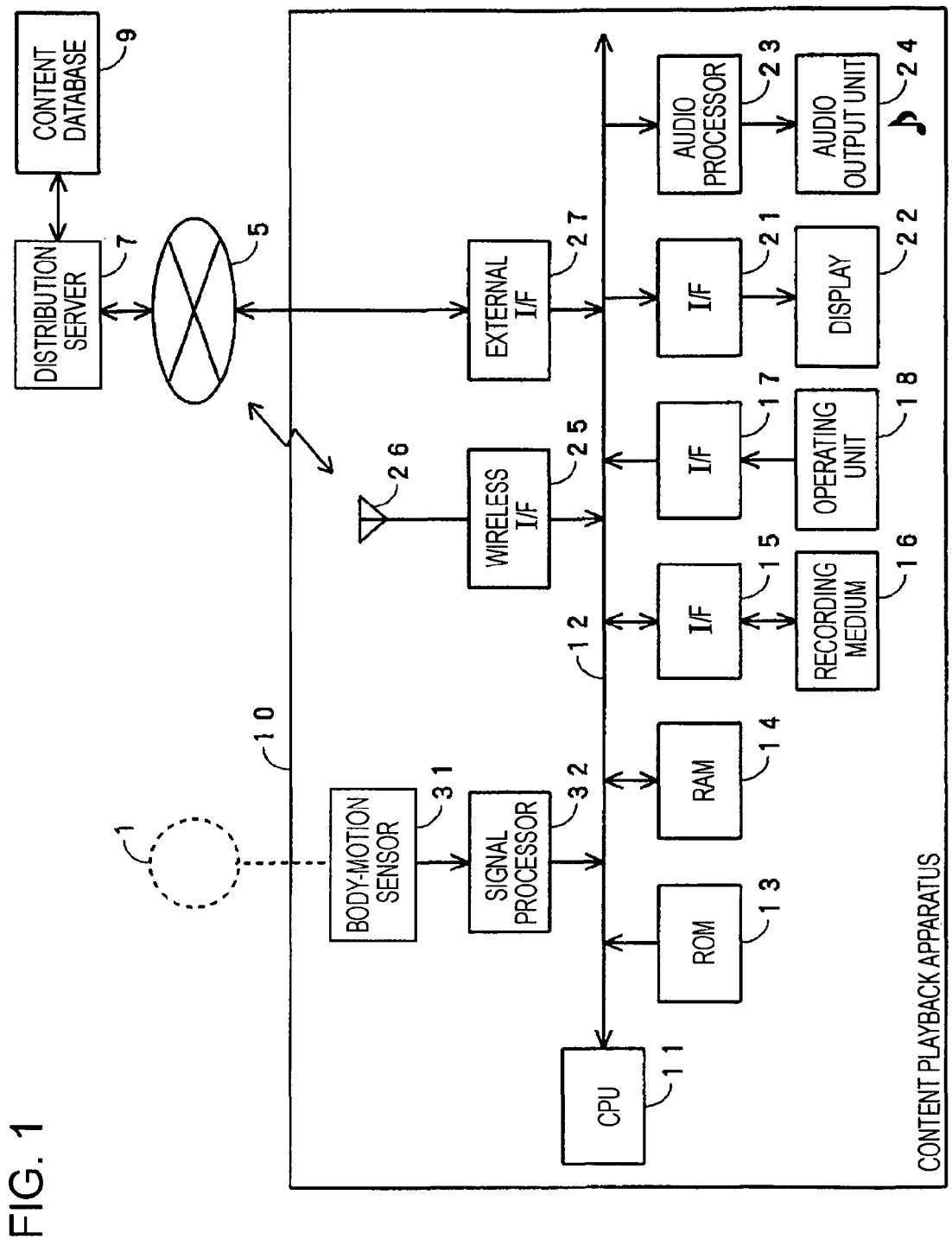
FIG. 1 is a diagram showing an example of a system for executing a method according to an embodiment of the present invention.
Figure 2:
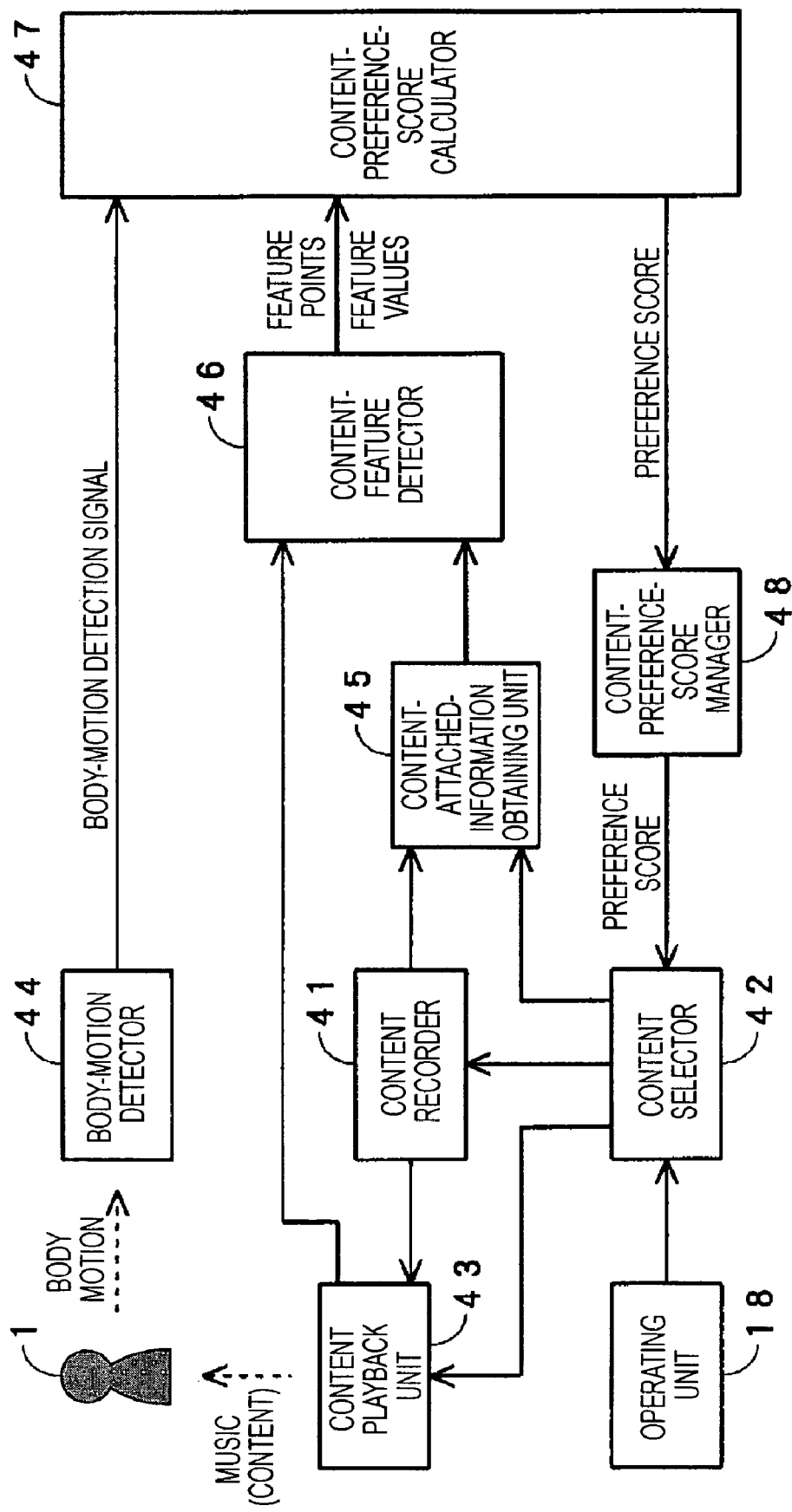
FIG. 2 is a diagram showing an example of the functional configuration of a content playback apparatus according to an embodiment of the present invention.

FIG. 1 shows a system for executing a content-preference-score determining method and content playback method according to an embodiment of the present invention. This embodiment relates to a case where content is music (song).

A content playback apparatus 10 also serves as a content-preference-score determining apparatus; i.e., the content playback apparatus 10 has a function of determining a content preference score.

More specifically, the content playback apparatus 10 includes a central processing unit (CPU) 11, and a read-only memory (ROM) 13 in which various programs and data have been written and a random access memory (RAM) 14 to which the programs and data are loaded are connected to a bus 12 thereof. Furthermore, a recording medium 16, such as a hard disc or flash memory, is connected via an interface 15.

In the recording medium 16, music data (song data) as content data (main content data), music-attached information (song-attached information) as content-attached information (metadata), and information representing a preference score that is set as will be described later, etc., are recorded.

The bus 12 is also connected to an operating unit 18 via an interface 17, connected to a display 22 via an interface 21, and connected to an audio output unit 24 via an audio processor 23.

The operating unit 18 allows a user 1 to perform various operations and to enter various inputs. The display 22 displays a screen for operation input, a screen for presentation, or the like. The audio processor 23 expands audio data such as music data when the data is compressed, converts the data into analog audio signals, and amplifies the analog audio signals. The audio output unit 24 is a speaker or a headphone that outputs sound such as music.

The bus 12 is also connected to a wireless interface (wireless communication unit) 25, and to an external interface 27 for connecting to the Internet 5. Furthermore, an antenna 26 is connected to the wireless interface 25.

On the Internet 5, a distribution server 7 is connected. In response to a request from the content playback apparatus 10, music data and music-attached information recorded in a content database 9 connected to the distribution server 7 are transmitted from the distribution server 7 to the content playback apparatus 10. The music data and music-attached information that have been transmitted are downloaded to the recording medium 16 of the content playback apparatus 10.

Furthermore, in the content playback apparatus 10, a body-motion sensor 31 is connected to the bus 12 via a signal processor 32. The body-motion sensor 31 detects motion of the body of the user 1 during playback of music (content) as will be described later. The signal processor 32 converts signals output from the body-motion sensor 31 into digital data and analyzes the digital data.

FIG. 2 shows the functional configuration of the content playback apparatus 10 configured as described above. A content recorder 41 is formed by the recording medium 16 and associated parts. The content recorder 41 records music data as content data (main content data), music-attached information as content-attached information, etc.

A content selector 42 is formed of the CPU 11, the ROM 13, and the RAM 14. The content selector 42 selects a piece of music (song) that is to be played back on the basis of an operation performed by the user 1 via the operating unit 18, and reads data corresponding to the piece of music (song data) from the content recorder 41.

The music data that is played back need not necessarily be music data recorded in the content recorder 41, and may be distributed from the distribution server 7.

A content playback unit 43 is formed of the audio processor 23 and the audio output unit 24. The content playback unit 43 plays back music according to the music data read from the content recorder 41 or distributed from the distribution server 7.

A body-motion detector 44 is formed of the body-motion sensor 31 and the signal processor 32. The body-motion detector 44 detects motion of the body of the user 1 during playback of music.

A content-attached-information obtaining unit 45 is formed of the CPU 11 and associated parts. The content-attached-information obtaining unit 45 reads from the content recorder 41 music-attached information accompanying the piece of music selected by the content selector 42. The music-attached information need not necessarily be music-attached information recorded in the content recorder 41, and may be distributed from the distribution server 7.

A content-feature detector 46 is formed of the CPU 11 and associated parts. The content-feature detector 46 detects feature points or feature values of the music from the music-attached information obtained by the content-attached-information obtaining unit 45. Alternatively, feature points or feature values of music may be extracted from the music data obtained by the content playback unit 43. For example, the feature points or feature values may include the beat, bar positions, or tempo (speed of playback of music) during the playback period of the music, and may additionally include a rhythm pattern, playback volume, or the like.

A content-preference-score calculator 47 is formed of the CPU 11 and associated parts. The content-preference-score calculator 47 calculates a preference score of the user 1 for the piece of music according to a predefined formula on the basis of body-motion detection signals obtained from the body-motion detector 44, i.e., body motion of the user 1 during playback of the music, and feature points or feature values of the music detected by the content-feature detector 46.

A content-preference-score manager 48 is formed of the CPU 11 and associated parts. The content-preference-score manager 48 records the preference score calculated by the content-preference-score calculator 47 in the content recorder 41 in association with the piece of music so that the preference score is set for the piece of music. Also, the content-preference-score manager 48 retrieves the preference score for selection of a piece of music by the content selector 42 on subsequent occasions of playing back music.

2. Preference-Score Determining Method (FIGS. 3 to 17)

A specific example of the preference-score determining method executed by the content playback apparatus 10 described above will be described below.

2-1. Body-Motion Detection (FIGS. 3 to 7)

The body-motion sensor 31 detects motion of the body of the user 1 during playback of music, such as motion of the head or swinging of the arms. As the body-motion sensor 31, for example, an acceleration sensor or a video camera may be used.

Figure 3A:
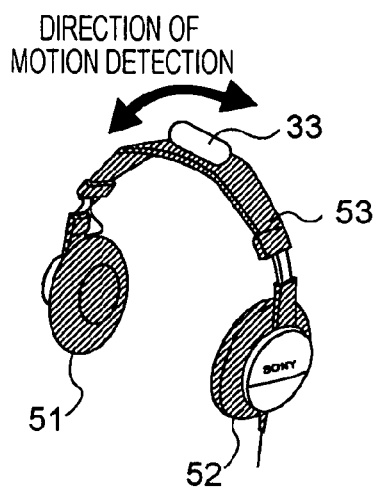
FIGS. 3A to 3C are illustrations showing examples of detection of body motion.
Figure 3B:
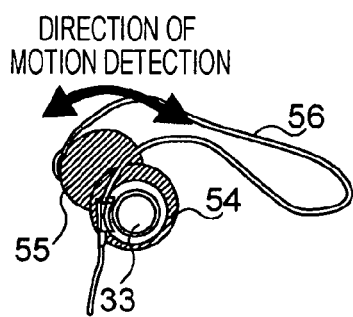
Figure 3C:
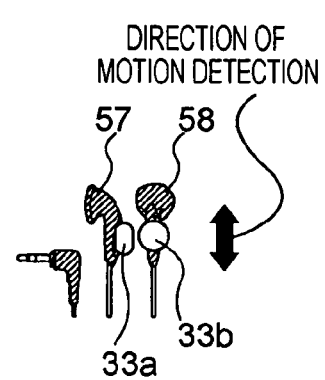

As an example, as shown in FIG. 3A, an overhead headphone has a left and right speakers 51 and 52 and a head band 53, and an acceleration sensor 33 is attached to the head band 53. As another example, as shown in FIG. 3B, a neckband headphone has left and right speakers 54 and 55 and a neckband 56, and an acceleration sensor 33 is attached to one or both of the speakers 54 and 55. As yet another example, as shown in FIG. 3C, an inner-ear headphone has speakers 57 and 58 that are to be inserted in left and right ear holes, and acceleration sensors 33a and 33b are attached to the speakers 57 and 58.

It is natural for the user to swing the head in synchronization with music. Thus, by detecting the motion of the head using one or more acceleration sensors attached to a headphone mounted on the user's head, the degree of synchronization of the user with the music can be measured more naturally.

Figure 4:
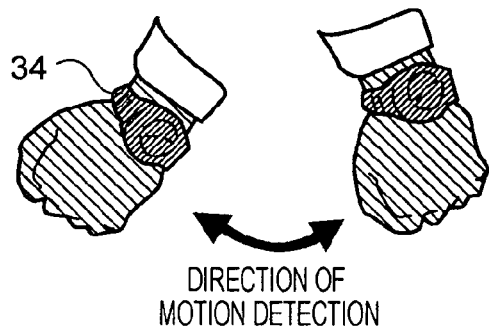
FIG. 4 is an illustration showing an example of detection of body motion.

Alternatively, as shown in FIG. 4, the user may wear a wristwatch having an acceleration sensor 34 on the wrist, so that swinging of the user's arm can be detected. When the content playback apparatus 10 takes the form of a wristwatch, an acceleration sensor is included in the content playback apparatus 10.

Figure 5:
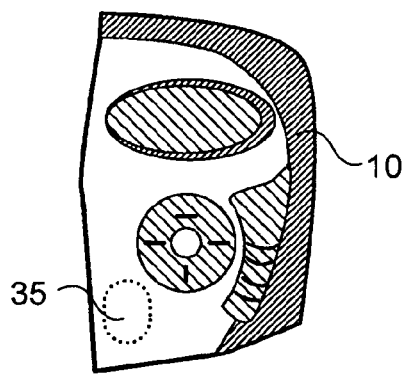
FIG. 5 is an illustration showing an example of detection of body motion.
Figure 6A:
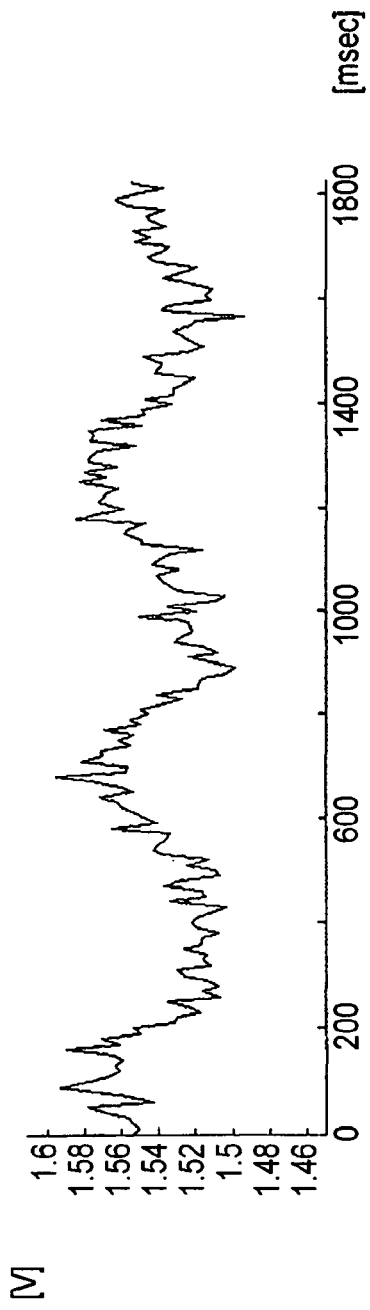
FIGS. 6A and 6B are graphs showing an example of sensor output signal and an autocorrelation waveform thereof.
Figure 6B:
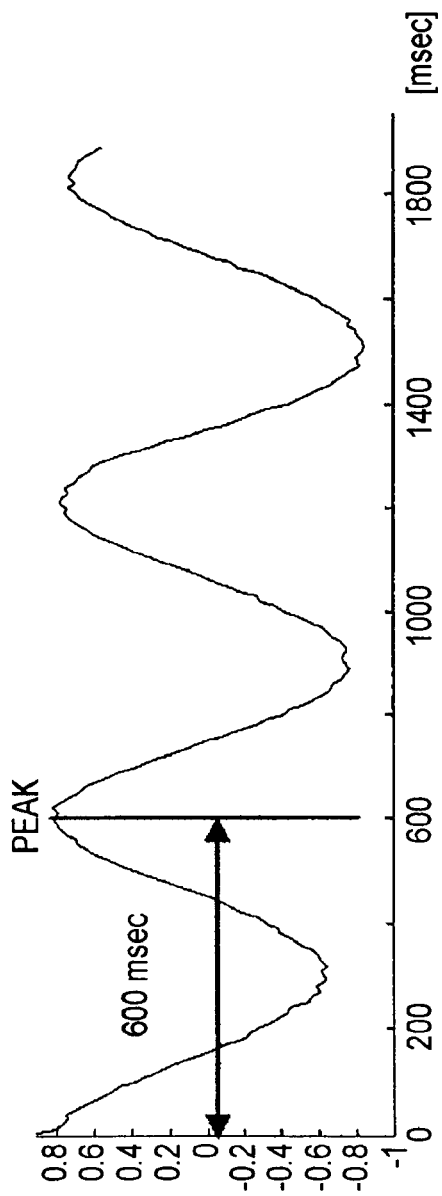

When the content playback apparatus 10 takes the form of a portable device, as shown in FIG. 5, the content playback apparatus 10 may include a three-axis acceleration sensor 35. In a type of portable hard disc player, a three-axis acceleration sensor is mounted to detect falling of the player, so that damage to parts relating to the hard disc can be prevented. Using the three-axis acceleration sensor, the motion of the body of the user carrying the content playback apparatus 10 and listening to the music can be detected.

When the body-motion sensor 31 is one of the acceleration sensors described above, signals shown in FIG. 6A are obtained as sensor output signals.

Figure 7:
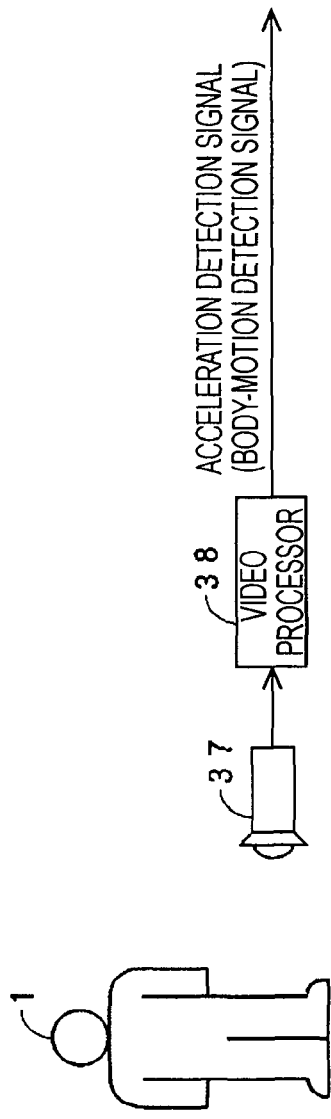
FIG. 7 is an illustration showing an example of detection of body motion.

Also, in an indoor place or the like, as shown in FIG. 7, it is possible to detect the motion of the body of the user 1 by taking an image of the user 1 by a video camera 37 and processing video data output from the video camera 37 by a video processor. More specifically, the video processor 38 compares frames of image data with each other to calculate inter-frame differences, thereby detecting the speed of the motion. Also, by calculating the difference of speeds, an acceleration of the motion can be detected.

2-2. Feature Detection (FIG. 8)

Feature points or feature values of music are detected from music data of the music or music-attached information accompanying the music.

Figure 8:
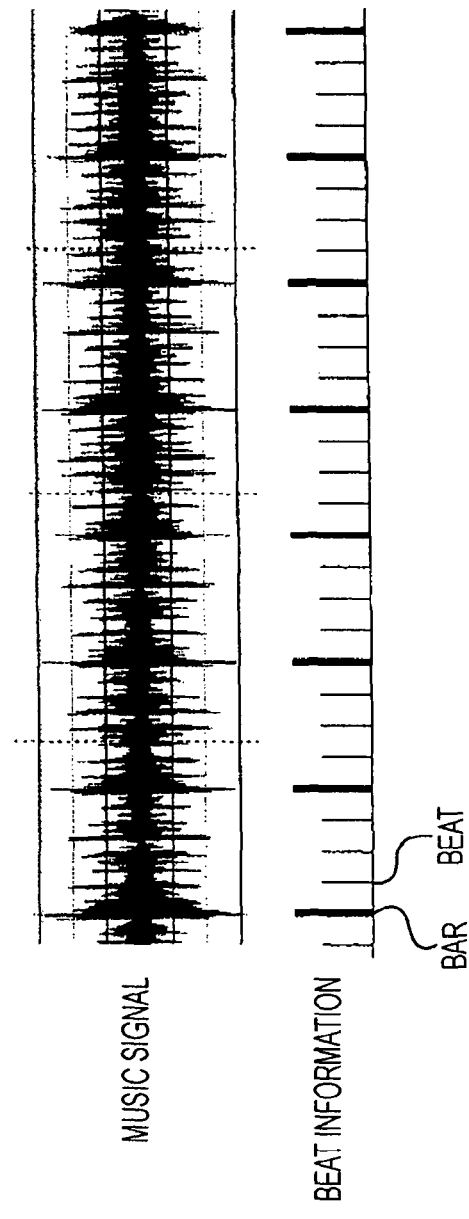
FIG. 8 is a diagram showing an example of music signal and beat information.

FIG. 8 shows an example where feature points or feature values of a song are detected from music data. FIG. 8 shows the waveform of analog signals of music data, in which points of largest magnitudes correspond to the beginnings of bars and points of large magnitudes correspond to beats. "Beats" herein includes bars.

In this example, beats (beat timings) of a song are detected as beat information. The extraction of beats can be achieved, for example, by real-time beat tracking by a special-purpose application program or the like.

When beat information of the song has been recorded as music-attached information, beat information can be extracted from the music-attached information.

In this case, for example, the music-attached information including beat information is recorded on the recording medium 16 in a separate chunk in the same file as the music data or as a separate file from the music data and is retrieved when a preference score is calculated. Alternatively, the music-attached information including beat information may be recorded in the content database 9 at the distribution server 7 and obtained from the distribution server 7 in advance or when a preference score is calculated.

2-3. Calculation of Preference Score (FIGS. 9 to 16)

Formula for Calculating Preference Score (FIG. 9)

A preference score of the user for the song is calculated, for example, as expression (1) shown in FIG. 9. $R(t)$ denotes a preference score at time t, $C(t)$ denotes a degree of matching of the periods of body-motion detection signals and beat information, $P(t)$ denotes a degree of matching of the phases of body-motion detection signals and beat information, $I(t)$ denotes the magnitude of body motion (intensity of rhythm), and $\alpha$ and $\beta$ denote weighting coefficients.

That is, in this example, the calculated preference score $R(t)$ becomes higher and therefore the preference score of the user for the song is considered to be higher as the degree of matching $C(t)$ of the periods of body-motion detection signal and beat information becomes higher, as the degree of matching $P(t)$ of the phases of body-motion detection signals and beat information becomes higher, and as the body motion of the user becomes larger.

Figures 11, 12, 13:
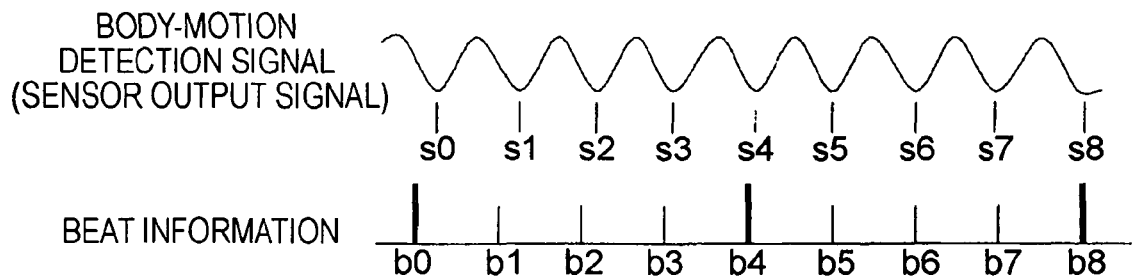
FIG. 11 is a diagram showing an example of body-motion detection signal and beat information.
FIG. 12 is a diagram showing an example of formula for calculating a beat period.
FIG. 13 is a diagram showing an example of formula for calculating a degree of matching of phase.

Degree of Matching $C(t)$ of Periods (FIGS. 10 to 12)

The degree of matching $C(t)$ of the periods of body-motion detection signals and beat information in expression (1) shown in FIG. 9 is calculated as the absolute value of the difference between a period $Sc(t)$ of the body-motion detection signals and a period $Bc(t)$ of the beat information.

The period $Bc(t)$ of the beat information can be calculated as a period between adjacent beat timings $b(t+1)$ and $b(t)$, as expressed in expression (3) in FIG. 10.

When the tempo of a song is substantially constant through the entire song, beat information can be obtained from information representing the tempo of the song, included in music-attached information. More specifically, letting the tempo of the song be denoted by Tm, assuming four-four time, the period $Bc(t)$ can be calculated as $60/Tm$. For example, when $Tm=120$, $Bc(t)=0.5$ (sec).

The period of body-motion detection signals, i.e., the period $Sc(t)$ of body motion, can be obtained by a first or second method described below.

In a first method, the period $Sc(t)$ is obtained from maximum points or minimum points of body-motion detection signals. For example, minimum points $s(t)$ of the body-motion detection signals are points (timings) indicated as s0, s1, s2, ... in FIG. 11, and the period $Sc(t)$ can be obtained as a period between adjacent minimum points s(t+1) and s(t) as expressed by expression (4) in FIG. 12. In this case, when moving average is used, although a time delay occurs, a stable value can be obtained.

In a second method, the period Sc(t) is obtained from autocorrelation of the body-motion detection signals. For example, when the body-motion detection signals (sensor output signals) are signals shown in FIG. 6A, the autocorrelation thereof is represented by a waveform shown in FIG. 6B. Thus, it is detected that the period Sc(t) is 600 milliseconds.

The period of human motion, when considered in terms of the tempo of music, is rarely less than a tempo of 60 beats per minute. Thus, in this case, the amount of calculation can be reduced by performing calculation using a one-second window.

Also, it is difficult to swing the head or move the body in synchronization with beats with a fast tempo, so that it is often the case that the user moves the body at a rate of once for a plurality of beats or once for each bar. Thus, the degree of matching C(t) of periods may be calculated by calculating mutual correlation. Alternatively, the period Bc(t) of beat information of the song may be multiplied by N (where N is an integer not less than 2) in accordance with the tempo of the song and the result may be compared with the period Sc(t) of the body-motion detection signals.

Degree of Matching P(t) of Phases (FIGS. 13 and 14)

The degree of matching P(t) between the phases of body-motion detection signals and beat information in expression (1) in FIG. 9 can be calculated by a first or second method described below.

In a first method, first, a deviation d(t) between a minimum-point timing s(t) of the body-motion detection signals and an associated beat timing b(t) is calculated, as expressed by expression (5) in FIG. 13. Expression (5) is used in a case where a moving average within a predetermined period T is calculated.

When the deviation d(t) is closed to 0, it can be presumed that the body motion matching the beat timing. Thus, as expressed by expression (6) in FIG. 13, the inverse of the deviation d(t) is set as the degree of matching P(t) of phases.

In a second method, as expressed by expression (7) in FIG. 14, a standard deviation SD(d(t)) of the deviation d(t) within the predetermined period T is calculated. Then, the inverse of the standard deviation SD(d(t)) is set as the degree of matching P(t) of phases.

With the first method, it is not possible to deal with cases where the user gets into the rhythm of the music by syncopation, as in the case of trailing offbeat, leading offbeat, or backbeat. The second method allows dealing with such cases.

However, P(t) calculated according to expressions (7) and (8) represents the stability of phases (phase difference) rather than the degree of matching of phases. When P(t) becomes higher, the degree of matching C(t) of periods automatically becomes higher. Thus, it suffices to use either C(t) or P(t) as a degree of matching.

Magnitude I(t) of Body Motion (FIGS. 15 and 16)

The magnitude I(t) of body motion in expression (1) in FIG. 9 can be calculated from an amplitude A(t) of body-motion detection signals.

As the amplitude (maximum value-minimum value) of body-motion signals within a predetermined period becomes larger, it is indicated that motion is greater (more intense). Thus, as expressed by expression (9) in FIG. 15, the magnitude I(t) of body motion can be calculated by normalizing the amplitude A(t) of body-motion detection signals by N in accordance with the manner of attachment or the sensitivity of the body-motion sensor 31. FIGS. 16A and 16B show a comparison between cases where the amplitude A(t) is small and the amplitude A(t) is large.

Calculation of Preference Score R(t)

The degree of matching C(t) of periods, the degree of matching P(t) of phases, and the magnitude I(t) of body motion are calculated as described above, and a preference score R(t) is calculated according to expression (1) in FIG. 9. The weighting coefficients α and β are adjusted in accordance with the hardware configuration of the content playback apparatus 10, the manner of attachment of the body-motion sensor 31, etc.

The preference score R(t) is calculated in the manner described above. However, a final result of calculation may be obtained by representing the preference score R(t) by an integer or integrating (averaging) the preference score R(t) over the entire song as will be described later.

Furthermore, as described later, the preference score that has been calculated is presented to the user and recorded in association with the song, so that the preference score is set as a preference score for the song.

2-4. Preference-Score Determining Process (FIG. 17)

Figure 17:
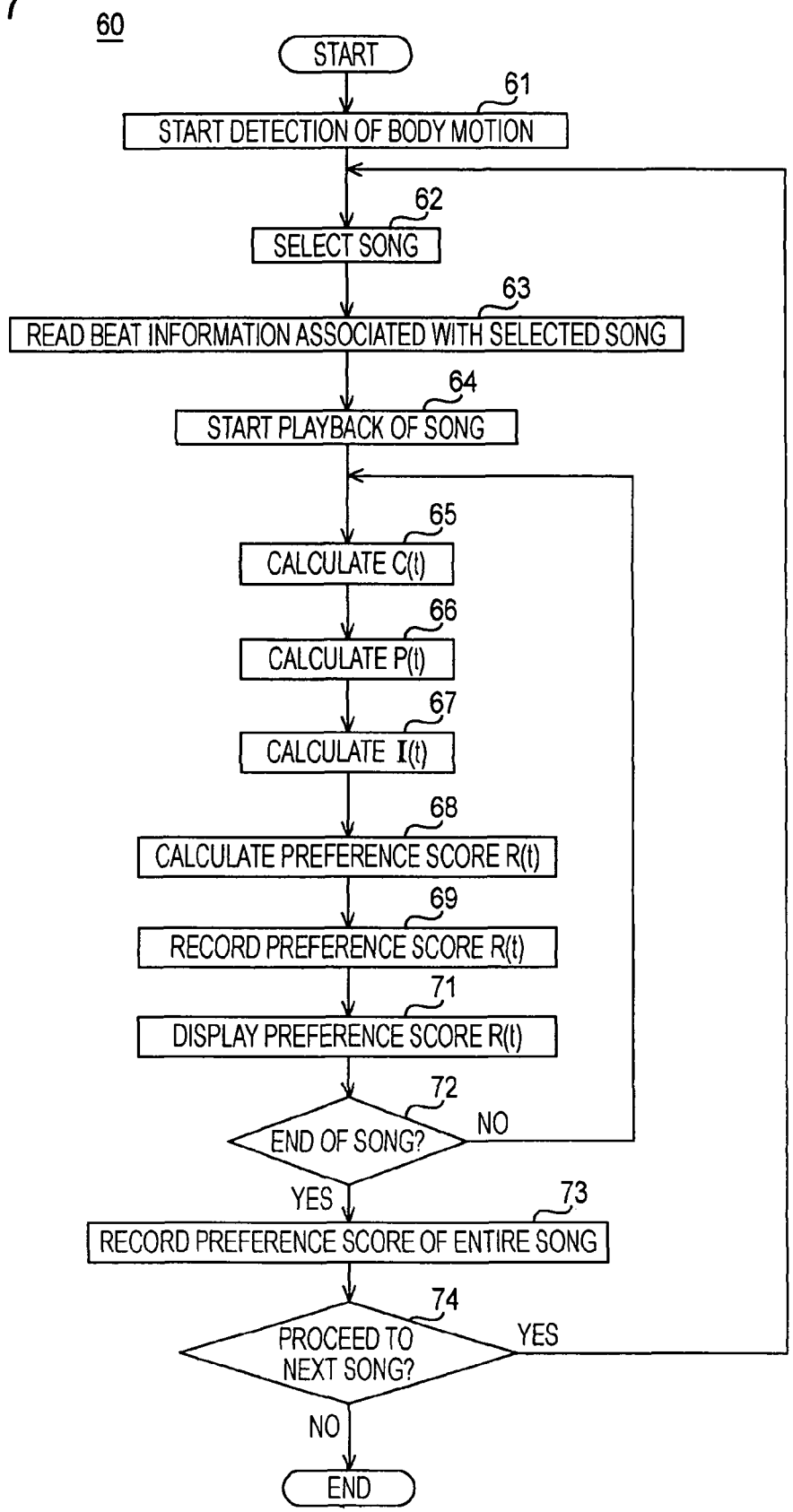
FIG. 17 is a flowchart showing an example of preference-score determining process.

FIG. 17 shows an example of the preference-score determining process executed by the content playback apparatus 10 as described above.

A preference-score determining process 60 in this example is started in response to a user's instruction. First, in step 61, detection of body motion by the body-motion sensor 31 and the signal processor 32 is started. Then, in step 62, a song specified by the user is selected. Then, in step 63, beat information associated with the selected song is read.

Then, in step 64, playback of the selected song is started. In step 65, a degree of matching C(t) of period is calculated. In step 66, a degree of matching P(t) of phase is calculated. In step 67, a magnitude I(t) of body motion is calculated. Then, in step 68, a preference score R(t) is calculated.

Then, the calculated preference score R(t) is recorded in step 69, and the calculated preference score R(t) is presented in step 71. The recording in step 69 is temporary recording in the RAM 14 until the completion of processing regarding the selected song, and differs from the setting of a preference score described later. A method of presentation in step 71 will be described later.

Then, in step 72, it is checked whether playback of one song and processing for one song have been finished. When the playback and processing have not been finished, the process returns to step 65 to repeat calculation of a preference score. When the playback and processing have been finished, the process proceeds to step 73, in which a preference score for one song is recorded.

As the preference score for one song, it is possible to calculate one value for each song, for example, by representing the preference score R(t) by an integer or integrating the preference score R(t) over the entire song.

The preference score for one song is recorded to set a preference score for the song, by recording information representing the preference score for one song on the recording medium 16 in association with the song.

When the preference score for one song has been recorded in step 73, the process proceeds to step 74, in which it is checked whether a next song exists that is to be played back and for which a preference score is to be calculated. When a next song exists, the process returns to step 62 to execute processing for the next song. When a next song that is to be played back and for which a preference score is to be calculated does not exist, the preference-score determining process 60 is exited.

The presentation in step 71 is achieved by displaying the value of the calculated preference score R(t) on the display 22 or audibly reporting the value of the calculated preference score R(t) via the audio output unit 24.

Instead of presenting the preference score R(t) for each segment of the song in step 71, a preference score for one song may be presented immediately before or after step 73.

3. Preference-Score Setting Method (FIGS. 18 to 22)

The setting of a preference score, which is a step in the preference-score determining process described above, will be described separately below in more detail.

Figures 18, 19, 20:
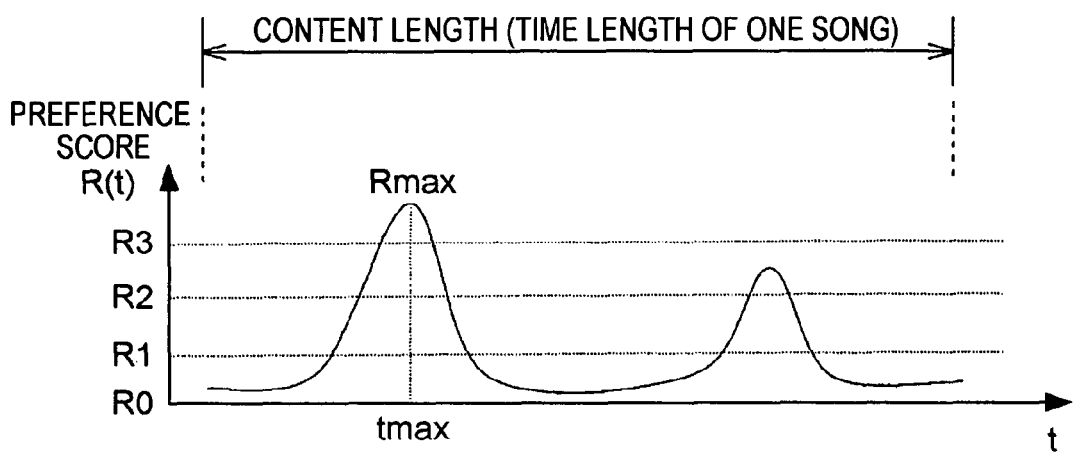
FIG. 18 is a graph showing an example of temporal change of calculated preference score.
FIG. 19 is a diagram showing expressions relevant to a case where one preference score is set for each song.
FIG. 20 is a table showing an example where one preference score is set for each song.

FIG. 18 shows an example of change of the calculated preference score R(t) within the period of one song. A time tmax denotes a time (as measured from the beginning of the song) when the preference score R(t) takes on a maximum value Rmax.

Regarding the setting of preference score, the calculated preference scores R(t) may be set directly for the song. Alternatively, it is possible to represent the preference scores R(t) by integers using thresholds R0, R1, R2, R3, . . . , and to set the integers for the song. Also, it is possible to set one preference score for one song.

3-1. Setting One Preference Score for One Song (FIGS. 19 and 20)

It is possible to set one preference score for one song using one of the following three methods.

In a first method, when the maximum value Rmax is in a threshold range expressed by expression (11) in FIG. 19, n (=0, 1, 2, 3, . . . ) is set as a preference score for the song. In the case of the example shown in FIG. 18, since R3<Rmax<R4, a preference score of 3 is set.

In a second method, as expressed by expression (12) in FIG. 19, the calculated preference score R(t) is integrated over the entire song, and the result of integration is normalized by dividing the result of integration by a time T of the song, the normalized value is represented by an integer in the manner described in the context of the first method, and the resulting value is set as a preference score for the song.

In a third method, the maximum value Rmax, or an integer corresponding to the maximum value Rmax, is recorded as a preference score for the song, together with the time tmax of the occurrence of the maximum value Rmax or a period including the tmax (the period when the preference score R(t) becomes greater than or equal to R3 in the example shown in FIG. 18).

FIG. 20 shows an example where preference scores are set by the third method. For example, regarding Song1, "3" is recorded as the preference score R(tmax), and "01:45" (as measured from the beginning of the song) is recorded as the time tmax.

3-2. Setting Plurality of Preference Scores for One Song (FIGS. 21 and 22)

When a plurality of preference scores is to be set for one song, the calculated preference scores R(t) shown in FIG. 21A are represented by integers as shown in FIG. 21B using thresholds R0 to RN, and a set of start point (Start), end point (End), and the preference score R(t) represented by an integer is recorded for each segment of the song, as represented in a preference-score table shown in FIG. 22.

Alternatively, it is possible to record a set of start point, end point, and preference score represented by an integer only for each segment having a preference score greater than or equal to a certain threshold (e.g., R2), as segments with high preference scores.

4. Content Playback, etc. after Setting of Preference Scores (FIGS. 23 to 26)

By seeing preference scores for songs in the manner described above, it is possible to play back or select songs in the following manner on the basis of the preference scores that have been set.

4-1. Continuous Playback of Digests Corresponding to Segments with Highest Preference Scores (FIGS. 23 and 24)

Figure 23:
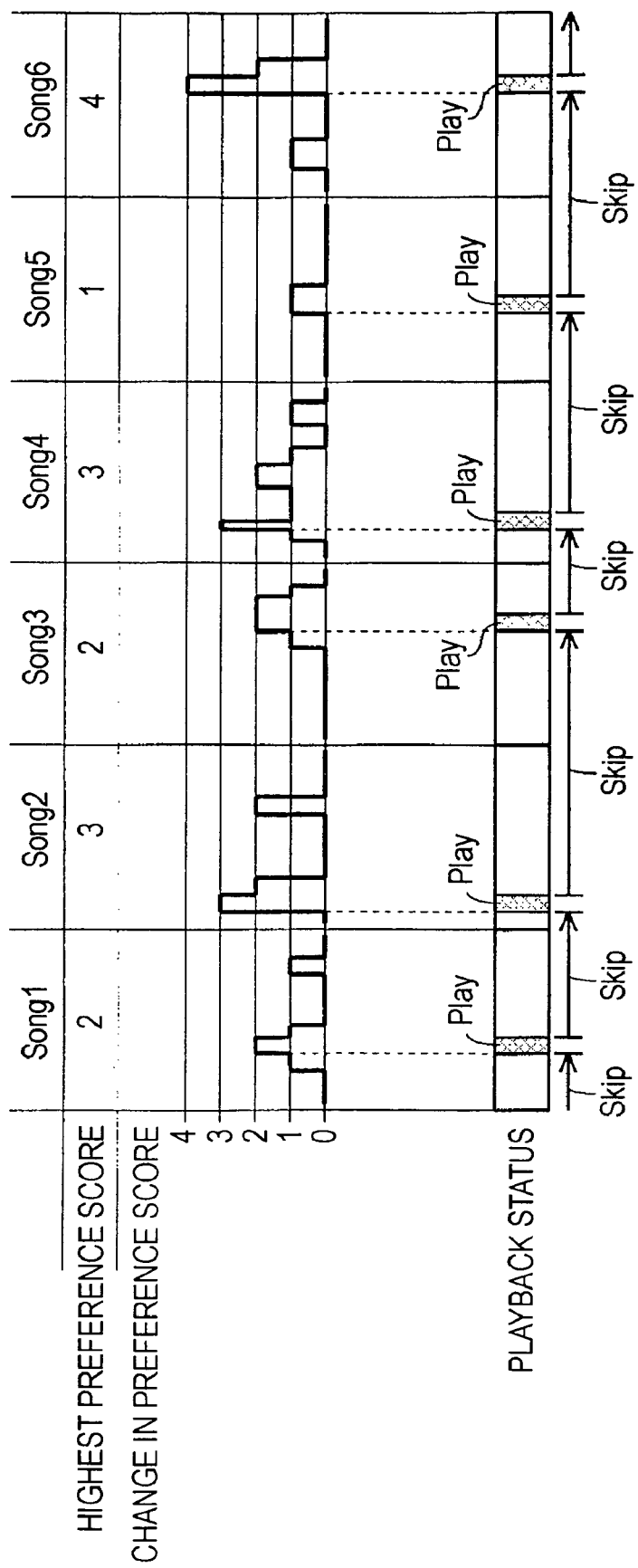
FIG. 23 is a diagram showing an example of continuously playing back digests corresponding to segments of highest preferences.
Figure 24:
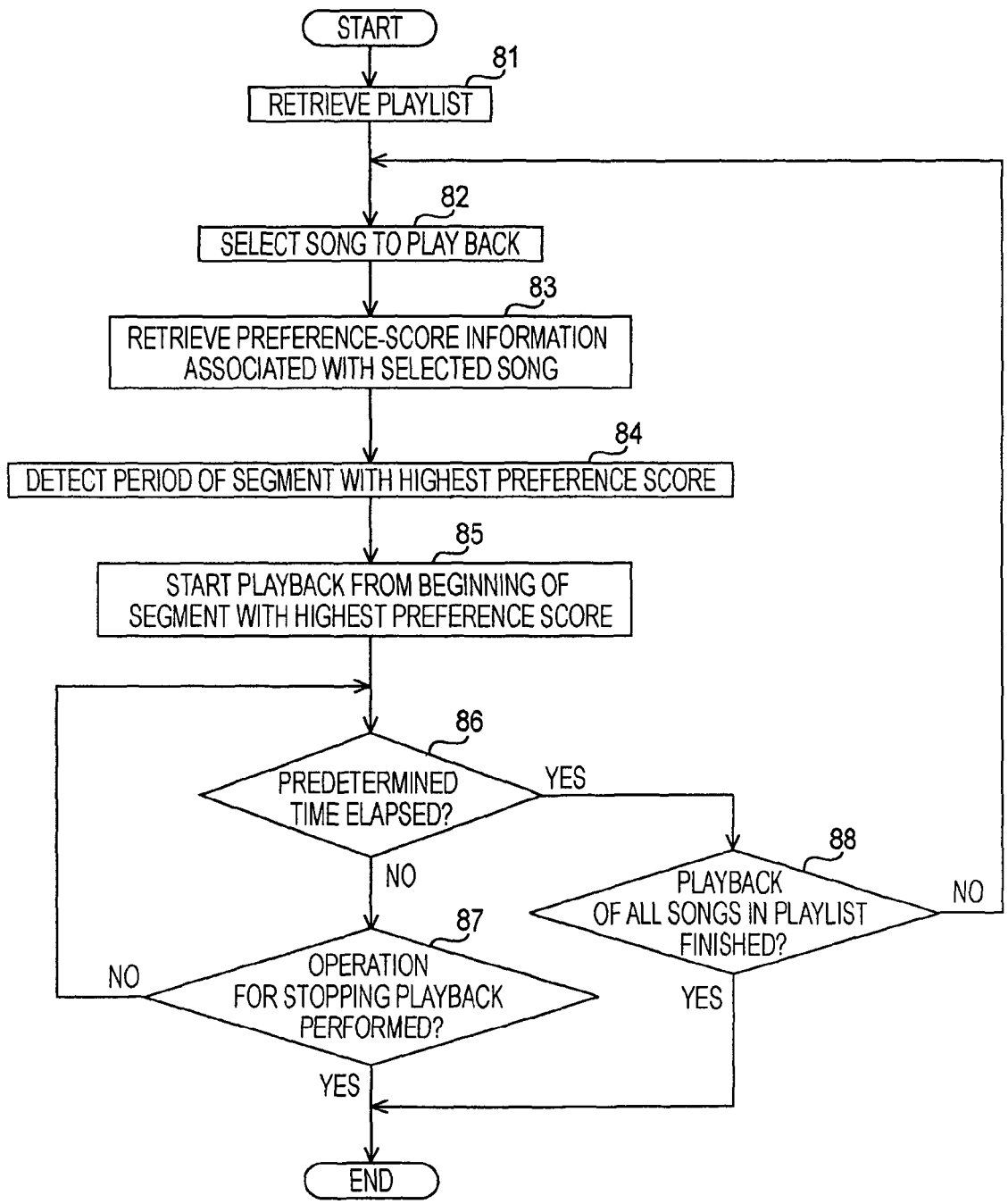
FIG. 24 is a flowchart showing an example of process of continuously playing back digests corresponding to segments of highest preferences.

FIG. 23 shows a case where preference scores represented by integers are set for individual segments of six songs included in a playlist (list of songs), which is shown as changes in preference scores. Song1 has a highest preference score of 2, Song2 has a highest preference score of 3, Song3 has a highest preference score of 2, Song4 has a highest preference score of 3, Song5 has a highest preference score of 1, and Song6 has a highest preference score of 4.

In this case, as indicated by "play" and "skip", only the segments (periods) with highest preference scores of the individual songs are played back while the other segments are skipped without being played back, so that the songs are continuously played back in order.

In the example of "playback status" shown in FIG. 23, however, strictly speaking, instead of "only segments with highest preference scores", segments of predetermined periods from the beginnings of segments of highest preference scores are sequentially played back. More specifically, Song1 is played back for the 15 seconds corresponding to the segment with the highest preference score (2), Song2 is played back for the 15 seconds corresponding to the segment with the highest preference score (3), Song3 is played back for the first 15 seconds of the segment with the highest preference score (2), Song4 is played back for 15 seconds corresponding to the segment with the highest preference score (3) and the immediately succeeding segment (with a preference score of 1), Song5 is played back for the first 15 seconds of the segment with the highest preference score (1), and Song6 is played back for the 15 seconds corresponding to the segment with the highest preference score (4).

FIG. 24 shows an example of process executed by the content playback apparatus 10 when digests corresponding to segments with highest preference scores are continuously played back.

In this example, a process 80 of continuously playing back digests corresponding to segments with highest preference scores is started in response to a playback instruction by the user with specification of a playlist. First, in step 81, the playlist specified by the user is retrieved. Then, in step 82, a song that is to be played back is determined. The order of playback is, for example, ascending order of song identification numbers or the order of listing in the playlist.

Then, in step 83, preference-score information associated with the song to be played back, such as the preference-score table shown in FIG. 22, is retrieved. Then, in step 84, a period of a segment with a highest preference score in the song (only the start point suffices in this example) is detected on the basis of the information. Then, in step 85, playback of the song is started from the beginning of the segment with the highest preference score.

Then, in step 86, it is checked whether playback has been continued for a predetermined time (e.g., 15 seconds as described above) since the start of playback. When playback has not yet been continued for the predetermined time, the process proceeds to step 87, in which it is checked whether the user has performed an operation for stopping playback. When the user has not performed an operation for stopping playback, the process returns to step 86.

When it is determined in step 86 that playback has been continued for the predetermined time, the process proceeds to step 88, in which it is checked whether playback of all the songs in the playlist has been finished. When playback of all the songs has not been finished, the process returns to step 82 to determine a next song, and a segment with a highest preference score in the next song is played back.

Although not shown in FIG. 23, when a plurality of segments having the same highest preference score and temporally separated from each other exist in a song, the segments are played back sequentially or only the first segment is played back.

Instead of playing back each song for a predetermined period from the beginning of a segment with a highest preference score as described above, it is possible to play back only a segment with a highest preference score, for the entirety of the segment with the highest preference score. In this case, the lengths of playback periods can vary among individual songs depending on the lengths of periods of segments with highest preference scores. Also in this case, when a plurality of segments having the same highest preference score and temporally separated from each other exist in a song, the segments are played back sequentially or only the first segment is played back.

When a song not having a preference score assigned thereto exists among the songs included in the playlist, the song is not played back at all, or the song is played back for a predetermined period from the beginning.

Also, when preference scores are set according to the third method for setting one preference score for each song, described earlier, highest preference scores and points of time are recorded, so that the continuous playback of digests corresponding to segments with highest preference scores, described above, is allowed.

With the continuous playback of digests corresponding to segments with highest preference scores, described above, the user can listen to only parts of interest in individual songs sequentially with short periods.

Figure 25:
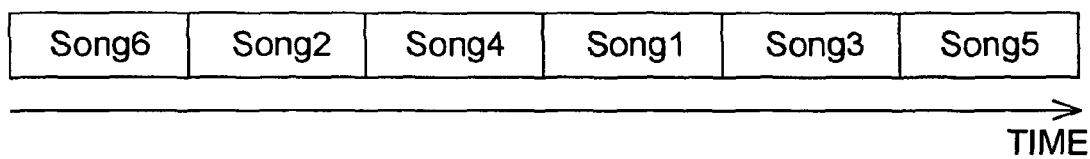
FIG. 25 is a diagram showing an example of shuffled playback.

4-2. Shuffled Playback (FIG. 25)

It is also possible to sequentially play back a plurality of songs in a playlist in descending order of highest preference scores.

For example, when preference scores are set for six songs in a playlist as shown in FIG. 23, the songs are played back in order of Song6 (highest preference score of 4), Song2 (highest preference score of 3), Song4 (highest preference score of 3), Song1 (highest preference score of 2), Song3 (highest preference score of 2), and Song5 (highest preference score of 1).

In this case, each of the songs may be played back in its entirety. Alternatively, as in the case of continuous playback of digests corresponding to segments with highest preference scores, it is possible to play back each of the songs only for a predetermined period from the beginning of a segment with a highest preference score, or to play back only a segment with a highest preference score in its entirety for each of the songs.

When a song not having a preference score assigned thereto exists among the songs included in the playlist, the song is not played back at all, or the song is played back finally in its entirety or for a predetermined period from the beginning.

Also, when preference scores are set according to the third method for setting one preference score for each song, described earlier, highest preference scores and points of time are recorded, so that the shuffled playback and the continuous playback of digests, described above, are allowed.

When preference scores are set according to the first or second method for setting one preference score for each song, described earlier, it is possible to sequentially playback songs in their entireties or for predetermined periods from the beginnings thereof in descending order of preference scores.

4-3. Playback by Searching for Segment with Highest Preference Score (FIG. 26)

It is possible to search for a segment with a highest preference score, as described below.

Figure 26:
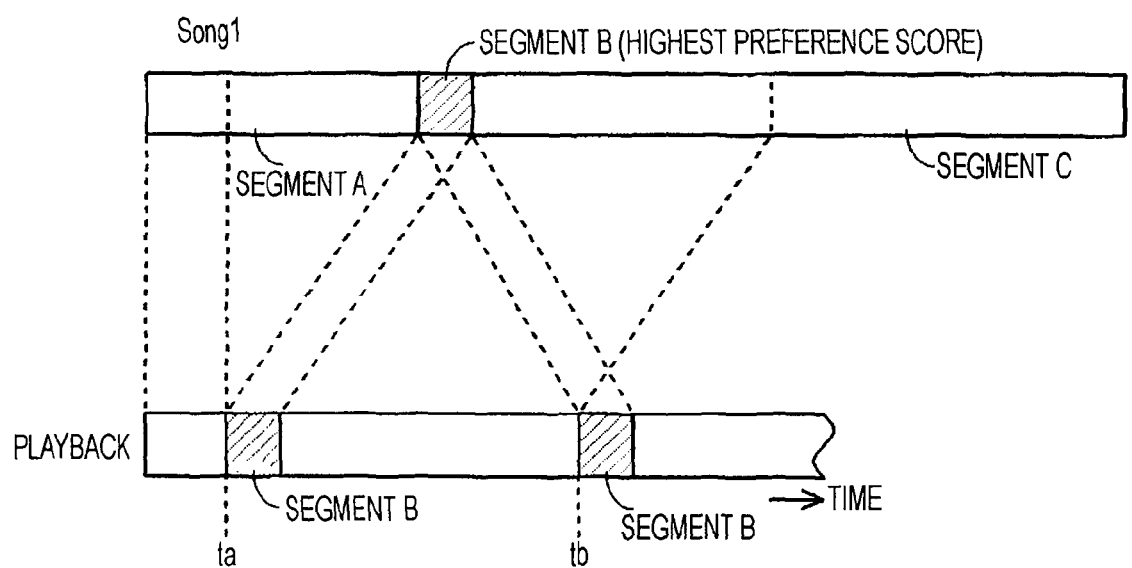
FIG. 26 is a diagram showing an example where playback is started from a segment of highest preference.

An upper part of FIG. 26 shows a state where a highest preference score is set for a middle segment B of a song and preference scores lower than the highest preference score are set for a preceding segment A and a succeeding segment C.

When a segment with a highest preference score is searched for and played back, after the user instructs playback of the song and playback of the song is started from the beginning thereof, when the user instructs searching for a segment with a highest preference score, for example, by operating a specific button, at time ta during playback of the segment A, playback is skipped to the beginning of the segment B with the highest preference score, and the segment B is played back, as shown in a lower part of FIG. 26.

After the segment B with the highest preference score is played back, when the user instructs searching for a segment with a highest preference score, at time tb during playback of the segment C, the playback returns to (is skipped to) the beginning of the segment B with the highest preference score, and the segment B is played back. Also, when the user instructs searching for a segment with a highest preference score at a time during playback of the segment B with the highest preference score, the playback returns from the middle of the segment B to the beginning of the segment B, and the segment B is played back.

That is, in response to instructions by the user, the segment B with the highest preference score is played back from the beginning thereof each time, so that the user can repeatedly listen to a segment of interest by simple operations.

Also, when preference scores are set according to the third method for setting one preference score for each song, described earlier, preference scores and points of time are recorded, so that the searching for a segment with a highest preference score, described above, is allowed.

4-4. Selection of Song on the Basis of Preference Scores

Also, it is possible to select and play back a song preferred by the user by the content playback apparatus 10 on the basis of preference scores that have been set.

For example, when preference scores are set for songs in a playlist as shown in FIG. 23, when the user specifies the playlist and instructs selection and playback of a song having a preference score or highest preference score that is greatest among the songs or that is greater than or equal to 4, the content playback apparatus 10 selects Song6, reads music data thereof from the recording medium 16, and plays back the music.

The degree of preference of the user for the same song may vary depending on time range or place. For example, the user may feel like listening to the song in the morning but not in the evening, or the user may feel like listening to the song outdoors but not at home.

Thus, the content playback apparatus 10 may be configured so that preference scores are calculated and set individually for different time ranges or for different locations measured by the Global Positioning System (GPS). In this case, when songs are selected after the preference scores are set, preference-score information in accordance with a current time range or location is retrieved and used for selection of a song.

4-5. Other Examples of Use of Preference Scores

When the user recommends music for another user, for example, by sending a playlist to a terminal of the another user, segments of interest can also be communicated by sending information representing preference scores that have been set, as meta information together with the playlist.

5. Other Embodiments

Although the description has been given mainly in the context of examples where content is music (songs), the present invention can also be applied to other types of content, such as video, light, or a series of physical operations using an actuator.

In the case of video content, as feature points or feature values of content, timings of scene changes or cut changes, beat timings or volumes of music or sound accompanying the video content, or the like are detected.

In the case of a series of physical operations using an actuator, as feature points or feature values of content, maximum points or minimum points in the series of operations, the amounts (amplitudes) of movement of individual parts in the series of operations, or the like are detected. By setting calculated preference score for the content, for example, it is possible to provide the user with only parts of operation preferred by the user.

It should be understood by those skilled in the art that various modifications, combinations, sub-combinations and alterations may occur depending on design requirements and other factors insofar as they are within the scope of the appended claims or the equivalents thereof.

What is claimed is:

1. A content-preference-score determining method comprising:
   during a playback of each of a plurality of pieces of content, each of the plurality of pieces of content comprising a plurality of segments:
   detecting a feature point or feature value of one or more segments of the piece of content;
   detecting a magnitude of a body motion of a user; and
   calculating a preference score of the user for each of the one or more segments of content according to a predefined formula using the detected feature point or feature value of each segment and the detected magnitude of the body motion; and
   after the playback of the plurality of pieces of content:
   controlling a subsequent playback of the content so that the one or more segments are played back in an order which is based at least in part on the preference score calculated for each of the one or more segments.

2. The content-preference-score determining method according to claim 1, further comprising, during the playback of each of the plurality of pieces of content:
   recording the calculated preference score in association with each of the one or more segments of content.

3. The content-preference-score determining method according to claim 1, further comprising:
   presenting the preference score calculated for at least a portion of the one or more segments of content.

4. The content-preference-score determining method according to claim 1, wherein the feature point or feature value of the one or more segments of the piece of content is detected from content-attached information accompanying each of the one or more segments of content.

5. The content-preference-score determining method according to claim 4, wherein the content-attached information is obtained from a network.

6. The content-preference-score determining method according to claim 1, wherein the feature point or feature value each of the one or more segments of content is detected from main data of each of the one or more segments of content.

7. The content-preference-score determining method according to claim 1, wherein the content is music, and a beat of the music is detected as the feature point or feature value.

8. A content playback apparatus comprising:
   feature detecting means for detecting, for each of a plurality of pieces of content, each of the plurality of pieces of content comprising a plurality of segments, a feature point or feature value of one or more segments of the piece of content;
   body-motion detecting means for detecting a magnitude of a motion of a user during the playback of each of the one or more segments of content;
   preference-score calculating means for calculating a preference score of the user, for each of the one or more segments of content, according to a predefined formula using the feature point or feature value detected by the feature detecting means for each of the one or more segments and the magnitude of the body motion detected by the body-motion detecting means during playback of each of the one or more segments; and
   playback control means for controlling a subsequent playback of the content so that the one or more segments are played back in an order which is based at least in part on the preference score calculated by the preference-score calculating means for each of the one or more segments.

9. The content playback apparatus according to claim 8, further comprising:
   preference-score recording means for recording the preference score calculated by the preference-score calculating means, in association with each of the one or more segments of content.

10. A content playback method comprising:
    during a playback of each of a plurality of pieces of content, each of the plurality of pieces of content comprising a plurality of segments:
    detecting a feature point or feature value of one or more segments of the piece of content;
    detecting a magnitude of a body motion of a user;
    calculating a preference score of the user for each of the one or more segments of content according to a predefined formula using the detected feature point or feature value of each of the one or more segments and the detected magnitude of the body motion;
    setting the calculated preference score in association with each of the one or more segments of content; and
    after the playback of each of the plurality of pieces of content:
    playing back only a segment with a highest preference score in the pieces of content, or a segment corresponding to a predetermined period from a beginning of the segment with the highest preference score.

11. The content playback method according to claim 10, further comprising playing back a plurality of pieces of content sequentially in descending order of preference score calculated for segments comprised in the pieces of content.

12. The content playback method according to claim 10, wherein when an instruction for skipping to a segment of interest is issued during playback of the content, playback is skipped to the beginning of the segment with the highest preference score in the content, and the segment is played back.

13. A content playback apparatus comprising:
    a feature detector configured to detect, for each of a plurality of pieces of content, each of the plurality of pieces of content comprising a plurality of segments, a feature point or feature value of one or more segments of a respective piece of content;

a body-motion detector configured to detect a magnitude of a motion of a user during the playback of the one or more segments of content;

a preference-score calculator configured to calculate a preference score of the user for the content according to a predefined formula using the feature point or feature value detected by the feature detector for each of the one or more segments and the magnitude of the body motion detected by the body-motion detector during playback of each of the one or more segments; and a playback controller configured to control a subsequent playback of the one or more segments of content so that the one or more segments are played back in an order which is based at least in part on the preference score calculated by the preference-score calculator for each of the one or more segments.

* * * * *